United States Patent
Hanai

(10) Patent No.: US 11,333,198 B2
(45) Date of Patent: *May 17, 2022

(54) SLIDING MEMBER

(71) Applicant: DAIDO METAL COMPANY LTD., Nagoya (JP)

(72) Inventor: Ryo Hanai, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/022,647

(22) Filed: Sep. 16, 2020

(65) Prior Publication Data

US 2021/0095719 A1    Apr. 1, 2021

(30) Foreign Application Priority Data

Sep. 26, 2019 (JP) .............................. JP2019-175167

(51) Int. Cl.
| | | |
|---|---|---|
| *B32B 15/20* | (2006.01) | |
| *F16C 33/12* | (2006.01) | |
| *B32B 15/01* | (2006.01) | |
| *C22C 38/00* | (2006.01) | |
| *C22C 9/00* | (2006.01) | |
| *C22C 38/04* | (2006.01) | |
| *C22C 38/02* | (2006.01) | |

(52) U.S. Cl.
CPC .......... *F16C 33/121* (2013.01); *B32B 15/015* (2013.01); *C22C 9/00* (2013.01); *C22C 38/002* (2013.01); *C22C 38/02* (2013.01); *C22C 38/04* (2013.01); *F16C 33/125* (2013.01); *F16C 2204/10* (2013.01)

(58) Field of Classification Search
None
See application file for complete search history.

(56) References Cited

U.S. PATENT DOCUMENTS 5,429,876 A * 7/1995 Tanaka ................. B32B 15/015
428/553

FOREIGN PATENT DOCUMENTS

| JP | H06-322462 A | 11/1994 |
|---|---|---|
| JP | 2002-220631 A | 8/2002 |
| JP | 2006-22896 A | 1/2006 |

* cited by examiner

*Primary Examiner* — Seth Dumbris
*Assistant Examiner* — Kim S. Horger
(74) *Attorney, Agent, or Firm* — Snyder, Clark, Lesch & Chung, LLP

(57) ABSTRACT

A sliding member includes a back-metal layer and a sliding layer made of a copper alloy. The back-metal layer is made of a hypoeutectoid steel including 0.07 to 0.35 mass % of carbon, and has a structure including a ferrite phase and pearlite. The back-metal layer includes a pore existing region including a plurality of closed pores that are not open to a bonding surface when viewing a cross-section perpendicular to a sliding surface. The closed pores have an average size of 5 to 15 μm. The pore existing region extends from the bonding surface toward an inner portion of the back-metal layer, and has a thickness of 10 to 60 μm. A ratio V2/V1 of a total volume V2 of the closed pores to a volume V1 of the pore existing region is 0.05 to 0.1.

7 Claims, 3 Drawing Sheets

SLIDING MEMBER

TECHNICAL FIELD

The present invention relates to a sliding member for a bearing, for example, used in internal combustion engines or automatic transmissions, or a bearing used in various machines. Specifically, the present invention relates to a sliding member including a sliding layer on a back-metal layer.

BACKGROUND ART

A sliding member such as sliding bearing has been used for a bearing device of an internal combustion engine, an automatic transmission, or the like. Such sliding bearing is formed in a cylindrical or semi-cylindrical shape from a sliding material including a copper alloy sliding layer on a steel back-metal layer. For example, JP 6-322462A and JP 2002-220631A describe a sliding member including a sliding layer made of a copper-lead bearing alloy or phosphor bronze. In such a sliding member, the sliding layer made of a copper alloy achieves seizure resistance and wear resistance as well as sliding properties, while the back-metal layer functions as a support of the copper alloy and imparts strength to the sliding member.

During operation of the internal combustion engine or the automatic transmission, the sliding member bears a dynamic load from a counter shaft member on the sliding surface of the sliding layer. For example, a sliding bearing is mounted to a cylindrical bearing holding hole of a bearing housing of the internal combustion engine or the automatic transmission, and bears a dynamic load from a rotating counter shaft member. In recent years, the internal combustion engine and the automatic transmission have a smaller weight in order to reduce fuel consumption, leading to lower rigidity of the bearing housing than that of a conventional bearing housing. Thus, in the bearing device of the internal combustion engine and the automatic transmission connected to the internal combustion engine, the bearing housing is more likely to be elastically deformed by a dynamic load from the counter shaft member during operation of the internal combustion engine. The sliding member (sliding bearing) mounted to the bearing holding hole of the bearing housing is elastically deformed in a circumferential direction due to the deformation of the bearing housing. In a conventional sliding member, when a varying circumferential force is applied to the sliding bearing, a difference in the amount of elastic deformation between the sliding layer made of the copper alloy and the steel back-metal layer, in some cases, leads to shear failure at an interface between the sliding layer and the back-metal layer, resulting in breakage of the sliding member.

JP 2006-22896A has an object of improving bonding strength between a bearing alloy layer and a steel back-metal layer. In JP 2006-22896A, a Cu—Sn—Fe-based alloy is used as a copper alloy, and a Sn—Fe compound is precipitated by heat treatment to cause the copper alloy to have finer grains, thereby improving bonding strength between the bearing alloy layer and the steel back-metal layer.

BRIEF SUMMARY OF THE INVENTION

The method described in JP 2006-22896A can improve bonding strength between the bearing alloy layer and the steel back-metal layer. However, the method is insufficient to prevent the occurrence of shear failure between the bearing alloy layer and the steel back-metal layer when a dynamic load is applied. Therefore, an object of the present invention is to provide a sliding member having more improved bonding between a sliding layer and a back-metal layer than in a conventional sliding member.

According to an aspect of the present invention, provided is a sliding member including: a back-metal layer having a back surface and a bonding surface; and a sliding layer that is made of a copper alloy and is provided on the bonding surface of the back-metal layer. The sliding layer has a sliding surface. The copper alloy includes 0.5 to 12 mass % of Sn, 0.5 to 15 mass % of Ni, 0.06 to 0.2 mass % of P, and the balance of Cu and inevitable impurities. The back-metal layer is made of a hypoeutectoid steel including 0.07 to 0.35 mass % of carbon, and has a structure including a ferrite phase and pearlite. The back-metal layer has a pore existing region that extends from the bonding surface toward an inner portion of the back-metal layer. In cross-sectional view perpendicular to the sliding surface, the pore existing region has a plurality of closed pores that are not open to the bonding surface and have an average size of 5 to 15 μm, and the pore existing region has a thickness of 10 to 60 μm. A ratio (V2/V1) of a total volume V2 of the closed pores to a volume V1 of the pore existing region is 0.05 to 0.1.

The sliding member according to the present invention has the pore existing region on the bonding surface of the back-metal layer serving as an interface with the sliding layer. Due to the plurality of closed pores of the pore existing region, the pore existing region is more likely to be elastically deformed, and a difference in elastic deformation is small between the copper alloy of the sliding layer and the pore existing region. Thus, when an external force is applied to the sliding member, a difference in elastic deformation is small between the copper alloy of the sliding layer and the pore existing region of the back-metal layer, and shear failure is less likely to occur between the copper alloy of the sliding layer and the back-metal layer.

According to an embodiment of the present invention, an average distance between the closed pores and the bonding surface is preferably 5 to 15 μm in cross-sectional view perpendicular to the sliding surface.

According to an embodiment of the present invention, an average distance between adjacent ones of the closed pores in a direction parallel to the bonding surface is preferably 5 to 15 μm in cross-sectional view perpendicular to the sliding surface.

According to an embodiment of the present invention, an average aspect ratio of the closed pores is preferably not more than 2.5 in cross-sectional view perpendicular to the sliding surface.

According to an embodiment of the present invention, a volume ratio Pc of pearlite in a structure of a center portion in a thickness direction of the back-metal layer and a volume ratio Ps of pearlite in the pore existing region preferably satisfy the following relation:

$Ps/Pc \leq 0.5$.

According to an embodiment of the present invention, a region of the back-metal layer excluding the pore existing region preferably includes 0.07 to 0.35 mass % of C, not more than 0.4 mass % of Si, not more than 1 mass % of Mn, not more than 0.04 mass % of P, not more than 0.05 mass % of S, and the balance of Fe and inevitable impurities.

According to an embodiment of the present invention, the copper alloy preferably further includes one or more selected from 0.01 to 10 mass % of Fe, 0.01 to 5 mass % of Al, 0.01 to 5 mass % of Si, 0.1 to 5 mass % of Mn, 0.1 to 30 mass % of Zn, 0.1 to 5 mass % of Sb, 0.1 to 5 mass % of In, 0.1 to 5 mass % of Ag, 0.5 to 25 mass % of Pb, and 0.5 to 20 mass % of Bi.

Other objects, features and advantages of the present invention will become apparent from the following description of non-limiting embodiments of the present invention with reference to the accompanying drawings.

DETAILED DESCRIPTION OF THE INVENTION

Figure 6:
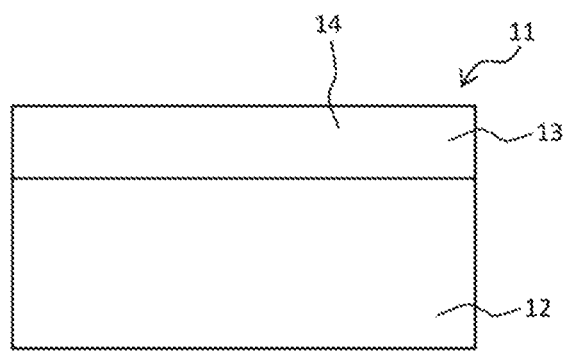
FIG. 6 is a schematic diagram of a cross section perpendicular to a sliding surface of a conventional sliding member.

FIG. 6 is a schematic diagram of a cross section of a conventional sliding member 11. The sliding member 11 includes a sliding layer 13 including a copper alloy 14 on one surface of a back-metal layer 12. The back-metal layer 12 includes a hypoeutectoid steel including 0.07 to 0.35 mass % of carbon, and has a structure of a typical hypoeutectoid steel. That is, the structure of the back-metal layer 12 includes mainly a ferrite phase 6 and granular pearlite 7 is dispersed in a matrix of the ferrite phase (see FIG. 2A). The structure is uniformly formed throughout a thickness direction of the back-metal layer 12. Thus, the back-metal layer 12 has approximately uniform deformation resistance against an external force throughout the thickness direction of the back-metal layer 12.

As described above, a bearing housing is more likely to be elastically deformed by a dynamic load from a counter shaft member during operation of a bearing device. Thus, in the case of the conventional sliding member 11, a varying circumferential force is applied, due to deformation of a bearing housing, to the sliding member (sliding bearing) mounted to a bearing holding hole of the bearing housing, leading to elastic deformation of the sliding member. In the conventional sliding member 11, the back-metal layer 12 has a structure of a typical hypoeutectoid steel, and has high strength and high deformation resistance as compared with the copper alloy 14 of the sliding layer 13. Thus, a difference in the elastic deformation is large between the back-metal layer 12 and the copper alloy 14 of the sliding layer 13 at an interface between the back-metal layer 12 and the sliding layer 13. Therefore, shear failure is more likely to occur between the back-metal layer 12 and the sliding layer 13.

Figure 1:
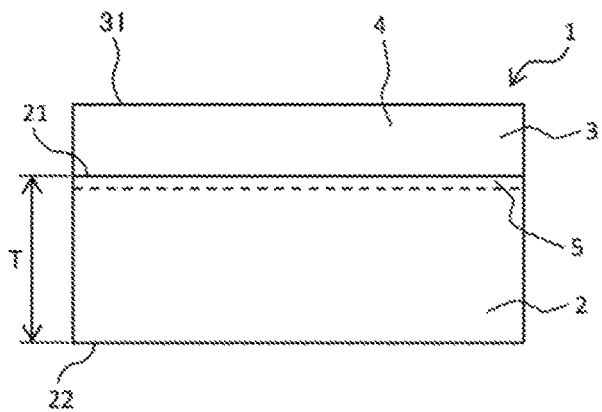
FIG. 1 is a schematic diagram of a cross section perpendicular to a sliding surface of an example of a sliding member according to the present invention.

An embodiment of a sliding member 1 according to the present invention is described below with reference to FIGS. 1, 2, and 2A. FIG. 1 is a schematic diagram showing a cross section of the sliding member 1 including a sliding layer 3 made of a copper alloy 4 on a back-metal layer 2. The sliding layer 3 has a sliding surface 31 on a side opposite to the back-metal layer 2. The back-metal layer 2 has a surface (bonding surface 21) on which the sliding layer 3 is formed, and a back surface 22 on a side opposite to the bonding surface 21. On the bonding surface 21 of the back-metal layer 2 which serves as an interface between the back-metal layer 2 and the copper alloy layer 4, a pore existing region 5 (described below) is formed.

The sliding member of the present invention may optionally include, on the surface of the sliding layer and/or the surface of back-metal layer, a coating layer of Sn, Bi or Pb or an alloys based on these metals, or a coating layer of a synthetic resin or a synthetic resin based coating. In this case, the surface of the sliding layer 3 is herein referred to as "sliding surface 31".

Figure 2:
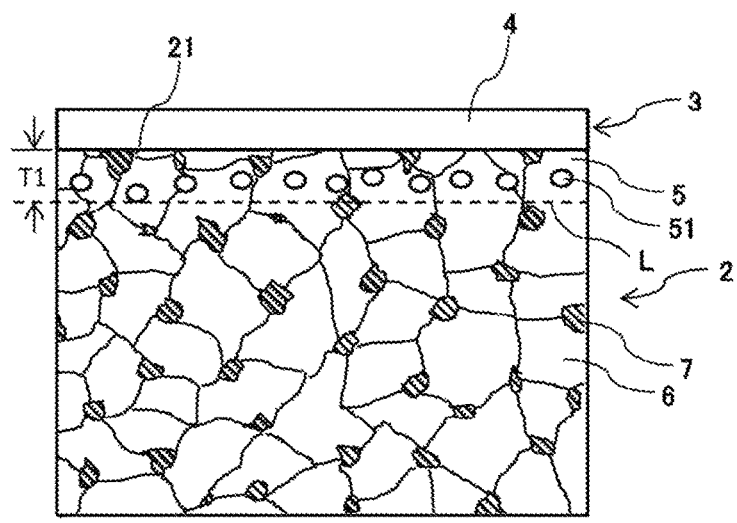
FIG. 2 is a schematic diagram of a cross-sectional structure in the vicinity of a pore existing region of a back-metal layer shown in FIG. 1.
Figure 2A:
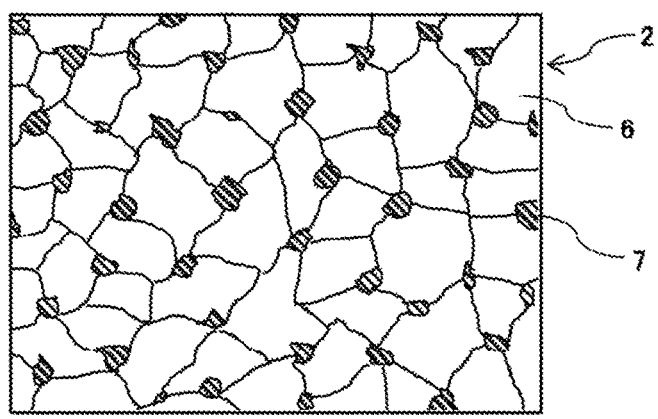
FIG. 2A is a schematic diagram of a cross-sectional structure of a center portion in a thickness direction of the back-metal layer shown in FIG. 1.

FIG. 2 is an enlarged view showing a structure in the vicinity of the bonding surface 21 of the back-metal layer 2. The back-metal layer 2 has a pore existing region that extends over a certain distance from the bonding surface 21 toward an inner portion of the back-metal layer 2 and has a large number of closed pores. On the other hand, FIG. 2A is an enlarged view showing a structure of a center portion in a thickness direction of the back-metal layer 2 (hereinafter simply referred to as "center portion of the back-metal layer 2"). In FIGS. 2 and 2A, the ferrite phase 6 and the pearlite 7 in the structure are exaggerated for easier understanding.

The copper alloy 4 of the sliding layer 3 has a composition including 0.5 to 12 mass % of Sn, 0.5 to 15 mass % of Ni, 0.06 to 0.2 mass % of P, and the balance of Cu and inevitable impurities. Sn, Ni, and P included in the copper alloy are elements that increase strength of the copper alloy. If the amount of these elements is less than the lower limit, the effect of the elements is insufficient, and if the amount of the elements is more than the upper limit, the copper alloy is brittle. During sintering (described later), Ni and P in the copper alloy 4 of the sliding layer 3 diffuse in the vicinity of the bonding surface of the back-metal layer 2 serving as the interface with the copper alloy layer 4. It relates to formation of the pore existing region 5 of the back-metal layer 2 (described later).

In some cases, elements included in the back-metal layer 2 diffuse in a portion of the copper alloy 4 of the sliding layer 3 in the vicinity of the bonding surface of the back-metal layer 2 during sintering. Such a case is also included in the scope of the present invention.

The copper alloy 4 may have a composition including, for example, 0.5 to 12 mass % of Sn, 0.5 to 15 mass % of Ni, and 0.06 to 0.2 mass % of P, and optionally one or more elements selected from 0.01 to 10 mass % of Fe, 0.01 to 5 mass % of Al, 0.01 to 5 mass % of Si, 0.1 to 5 mass % of Mn, 0.1 to 30 mass % of Zn, 0.1 to 5 mass % of Sb, 0.1 to 5 mass % of In, 0.1 to 5 mass % of Ag, 0.5 to 25 mass % of Pb, and 0.5 to 20 mass % of Bi. Fe, Al, Si, Mn, Zn, Sb, In and Ag increase strength of the copper alloy 4. If the amount of these elements is less than the lower limit, the effect of these elements is insufficient, and if the amount of these elements is more than the upper limit, the copper alloy 4 is brittle. Pb and Bi increase lubricating properties of the copper alloy 4. If the amount of Pb and Bi is less than the lower limit, the effect of Pb and Bi is insufficient, and if the amount of Pb and Bi is more than the upper limit, the copper alloy 4 is brittle. When the copper alloy 4 includes two or more of these selected elements, a total amount of the elements is preferably not more than 40 mass %.

The sliding layer 3 may optionally further include 0.1 to 10 volume % of one or more types of hard particles selected from $Al_2O_3$, $SiO_2$, AlN, $Mo_2C$, WC, $Fe_2P$, and $Fe_3P$. The hard particles are dispersed in a matrix of the copper alloy 4 of the sliding layer 3 and increase wear resistance of the sliding layer 3. If the amount of hard particles included in the copper alloy 4 is less than the lower limit, the effect of the hard particles is insufficient, and if the amount of hard particles included in the copper alloy 4 is more than the upper limit, the sliding layer 3 is brittle.

The sliding layer 3 may optionally further include 0.1 to 10 volume % of one or more solid lubricants selected from $MoS_2$, $WS_2$, graphite, and h-BN. The solid lubricant is dispersed in the matrix of the copper alloy 4 of the sliding layer 3 and increases lubricating properties of the sliding layer 3. If the amount of solid lubricant included in the copper alloy 4 is less than the lower limit, the effect of the solid lubricant is insufficient, and if the amount of solid lubricant included in the copper alloy 4 is more than the upper limit, the sliding layer 3 is brittle.

The back-metal layer 2 includes a hypoeutectoid steel including 0.07 to 0.35 mass % of carbon. As shown in FIG. 2A, the back-metal layer 2 has a structure including the ferrite phase 6 and the pearlite 7. If the back-metal layer 2 includes a hypoeutectoid steel including less than 0.07 mass % of carbon, the back-metal layer 2 has low strength, leading to insufficient strength of the sliding member 1. On the other hand, if the back-metal layer 2 includes a hypoeutectoid steel including more than 0.35 mass % of carbon, the back-metal layer 2 is brittle.

As described above, Ni and P in the copper alloy 4 of the sliding layer 3 diffuse, during sintering, into a portion (the pore existing region 5) in the vicinity of the bonding surface of the back-metal layer 2 serving as the interface with the copper alloy layer 4. Thus, the pore existing region 5 includes a larger amount of Ni and P than a region (hereinafter referred to as "main region") of the back-metal layer 2 excluding the pore existing region. The main region of the back-metal layer 2 may have a composition including 0.07 to 0.35 mass % of carbon, and one or more elements of not more than 0.4 mass % of Si, not more than 1 mass % of Mn, not more than 0.04 mass % of P, and not more than 0.05 mass % of S, and the balance of Fe and inevitable impurities. The structure of the back-metal layer 2 includes the ferrite phase 6 and the pearlite 7. Please note that this does not exclude that the structure of the back-metal layer 2 includes fine precipitates (that cannot be detected by observation of the structure at a magnification of 1000 times with use of a scanning electron microscope).

The ferrite phase 6 of the back-metal layer 2 includes only 0.02 mass % of carbon at maximum, and has a composition close to that of pure iron. On the other hand, the pearlite 7 of the back-metal layer 2 has a lamellar structure in which a ferrite phase and a cementite ($Fe_3C$) phase, which is an iron carbide, are alternately arranged to form a thin plate, and has higher strength than the ferrite phase 6.

In a cross-sectional structure shown in FIG. 2, a volume ratio between the ferrite phase 6 and the pearlite 7 is approximately the same between in the pore existing region 5 (except for closed pores 51) and in the main region of the back-metal layer 2.

The pore existing region 5 has the plurality of closed pores 51. The closed pores 51 are formed in grains or between grains of the ferrite phase 6 close to the bonding surface 21, and are not in contact with the bonding surface 21, that is, are not open to the bonding surface 21. In a cross-sectional view perpendicular to the sliding surface 31 (i.e., perpendicular to the bonding surface 21 of the back-metal layer 2), many of the plurality of closed pores 51 are spaced approximately the same distance from the bonding surface 21, and many of the plurality of closed pores 51 are spaced approximately the same distance also in a direction parallel to the bonding surface 21 (see FIG. 2).

The pore existing region 5 is a region that is defined to include the closed pores 51 and has a constant thickness T1 from the bonding surface 21 toward the inner portion of the back-metal layer 2 in cross-sectional view perpendicular to the sliding surface 31. The thickness T1 of the pore existing region 5 is 10 to 60 μm. The thickness T1 is more preferably 15 to 45 μm. Specifically, when an imaginary line L (dotted line L in FIG. 2) is drawn in contact with a contour of the closed pore 51 farthest from the bonding surface 21 (on an inner side of the back-metal layer 2) in the cross-sectional structure and parallel to the bonding surface 21 in cross-sectional view perpendicular to the sliding surface 31, the pore existing region 5 is a region that extends from the bonding surface 21 until the imaginary line L. The closed pores 51 are not observed in the structure of the back-metal layer other than the pore existing region 5. In some cases, voids or small holes such as minute flaws having a size of less than 0.5 μm may be observed, but such voids or small holes are not considered as the closed pores 51.

In a typical sliding member, the back-metal layer 2 has a thickness of 0.7 mm at minimum. When the thickness T1 of the pore existing region 5 is in the range of 10 to 60 μm, the pore existing region 5 has little influence on the strength of the back-metal layer 2. Furthermore, a ratio X1 of the thickness T1 of the pore existing region 5 to a thickness T of the back-metal layer is preferably not more than 0.07.

During sintering, Ni and P in the copper alloy 4 of the sliding layer 3 diffuse to solid-solve in the ferrite phase 6 in the pore existing region 5 of the back-metal layer 2. The pore existing region 5 (except for the closed pores 51) includes approximately 0.5 to 5 mass % of Ni and approximately 0.02 to 0.25 mass % of P.

Diffusion of Ni and P of the copper alloy 4 into the vicinity of the bonding surface 21 of the back-metal layer 2 can be observed by composition measuring a plurality of portions (e.g., 5 portions) of a cross-sectional structure perpendicular to the sliding surface 31 of the sliding member with use of an EPMA (electron probe microanalyzer).

In some cases, Cu, Sn, or the selected elements described above included in the copper alloy diffuse, in addition to Ni and P, in the vicinity of the bonding surface 21 of the back-metal layer 2 serving as the interface with the sliding layer 3 (i.e., in the vicinity of the pore existing region 5) during sintering (described later), and such a case is also included in the scope of the present invention.

A ratio of a total volume V2 of the closed pores 51 to a volume V1 of the pore existing region 5 is 5 to 10% (V2/V1=0.05 to 0.1). If the ratio V2/V1 is less than 5%, the pore existing region 5 has excessively high deformation resistance, leading to an insufficient effect of achieving a small difference in deformation resistance between the pore existing region 5 and the copper alloy 4 of the sliding layer 3 (i.e., difference in elastic deformation when an external force is applied to the sliding member). If the ratio V2/V1 is more than 10%, the pore existing region 5 of the back-metal layer 2 has excessively low deformation resistance, and thus when an external force is applied to the sliding member, in some cases, buckling (plastic deformation) occurs in the back-metal layer 2 (ferrite phase 6) around the closed pores 51.

The closed pores 51 have an average size of 5 to 15 µm. If the average size of the closed pores 51 is less than 5 µm, the ratio V2/V1 is more likely to be less than 5%, which is not preferable. If the average size of the closed pores 51 is more than 15 µm, the ratio V2/V1 is more likely to be more than 10%, which is not preferable.

Apparently, a maximum diameter of the closed pores 51 is smaller than the thickness T1 of the pore existing region 5.

The ratio V2/V1 of the total volume V2 of the closed pores 51 to the volume V1 of the pore existing region 5 is obtained in the following manner. First, a cross-sectional structure (which was cut, polished and etched with a nital solution which is a mixed solution of ethanol and 3% nitric acid) at a plurality of portions (e.g., 5 portions) cut in a direction parallel to a thickness direction of the sliding member 1 (i.e., a direction perpendicular to the sliding surface 31) is prepared. Next, electronic images of a portion in the vicinity of the bonding surface 21 of the back-metal layer 2 of the cross-sectional structure are taken at a magnification of 500 times with use of an electron microscope. Then, the pore existing region 5 is determined as described above in the images with use of a general image analysis method (analysis software: Image-Pro Plus (Version 4.5) manufactured by Planetron, Inc.). Subsequently, a thickness of the pore existing region 5 from the bonding surface 21 is measured, and then an area ratio of the closed pores 51 in the structure of the pore existing region 5 is measured. A value of the area ratio corresponds to the ratio of the total volume V2 of the closed pores 51 to the total volume V1 of the pore existing region 5. The magnification of the electronic images is not limited to 500 times, and may be changed to other magnifications.

In order to obtain the average size of the closed pores 51, the electronic images of the cross section is prepared with use of the above method, and an area of each of the closed pores 51 in the electronic images is measured with use of the image analysis method, and then a diameter of a circle having an area equal to the area of each of the closed pores 51 (equivalent circle diameter) is calculating. As described above, pores having a size of less than 0.5 µm are not considered as the closed pores 51.

Figure 3:
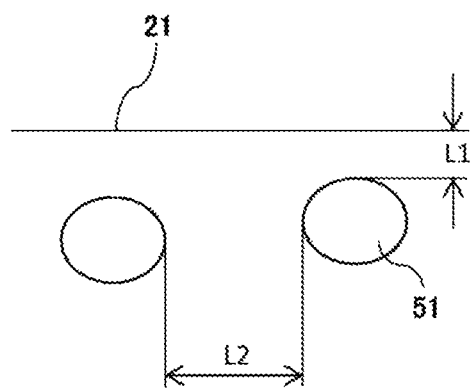
FIG. 3 is a diagram showing a distance L1 between a closed pore and a bonding surface, and a distance L2 between closed pores.

An average distance L1 of the closed pores 51 from the bonding surface 21 is preferably 2.5 to 25 µm, and more preferably 5 to 15 µm. The average distance L1 from the bonding surface 21 is a distance in a direction perpendicular to the bonding surface 21 in cross-sectional view perpendicular to the sliding surface 31 (see FIG. 3). The average distance L1 is obtained by using the electronic images obtained with use of the above method. A length from a portion of each of the closed pores 51 (i.e., a contour of each of the closed pores) closest to the bonding surface 21 to the bonding surface 21 is measured in the electronic images with use of the image analysis method, and then averaging the measured lengths.

If the average distance L1 is less than 2.5 µm, a steel material between the bonding surface 21 and the closed pores 51 (i.e., a matrix portion in the pore existing region 5) of the back-metal layer 2 has an excessively small thickness. Thus, when an external force is applied to the sliding member, in some cases, buckling (plastic deformation) occurs between the bonding surface 21 and the closed pores 51. If the average distance L1 is more than 25 µm, the steel material between the bonding surface 21 and the closed pores 51 (i.e., the matrix portion in the pore existing region 5) has an excessively large thickness, leading to an insufficient effect of achieving a small difference in deformation resistance between the pore existing region 5 and the copper alloy 4 of the sliding layer 3 (i.e., difference in elastic deformation when an external force is applied to the sliding member).

An average distance L2 between adjacent closed pores 51 is preferably 2.5 to 25 µm, and more preferably 5 to 15 µm. The average distance L2 between adjacent closed pores 51 is defined as a distance in a direction parallel to the bonding surface 21 in cross-sectional view perpendicular to the sliding surface 31 (see FIG. 3). The average distance L2 is obtained by using the electronic images with use of the above method, and a length in a direction parallel to the bonding surface 21 between a first closed pore 51 and a second closed pore 51 located closest to the first closed pore 51 (i.e., a length between contours (contour lines) of the closed pores 51) is measured in the electronic images with use of the image analysis method, and then the measured lengths are averaged.

If the average distance L2 is less than 2.5 µm, the steel material between the closed pores 51 (i.e., the matrix portion in the pore existing region 5) has an excessively small thickness (length), and thus when an external force is applied to the sliding member, in some cases, buckling (plastic deformation) of the back-metal layer 2 occurs between the closed pores 51. The average distance L2 of more than 25 µm leads to an insufficient effect of achieving a small difference in deformation resistance between the pore existing region 5 and the copper alloy 4 of the sliding layer 3 (i.e., difference in elastic deformation when an external force is applied to the sliding member).

An average aspect ratio Al of the closed pores 51 is preferably not more than 3, and more preferably not more than 2.5. The average aspect ratio Al of the closed pores 51 is represented by an average of the ratios between a major axis and a minor axis of the closed pores 51 in cross-sectional view perpendicular to the sliding surface 31. In a case where the closed pores 51 are substantially spherical, when an external force is applied to the sliding member, deformation of the closed pores 51 (deformation of the matrix portion in the pore existing region 5 around the closed pores 51) is less likely to occur. The closed pores 51 are preferably arranged so that the major axes of many of the closed pores 51 are oriented in a direction substantially parallel to the bonding surface 21.

Figure 4:
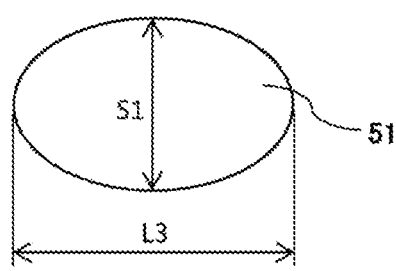
FIG. 4 is a diagram showing an aspect ratio Al of the closed pore.

The aspect ratio Al of the closed pores 51 is obtained by using the electronic images obtained with use of the above method, and an average of the ratios between a major axis length L3 and a minor axis length S1 (major axis length L3/minor axis length S1) of the closed pores 51 in the electronic images is measured with use of the image analysis method (see FIG. 4). The major axis length L3 of the closed pore indicates a length of the closed pore at a position at which the closed pore has a maximum length in the electronic images. The minor axis length S1 of the closed pore indicates a length of the closed pore at a position at which the closed pore has a maximum length in a direction orthogonal to the direction of the major axis length L3.

Figure 5:
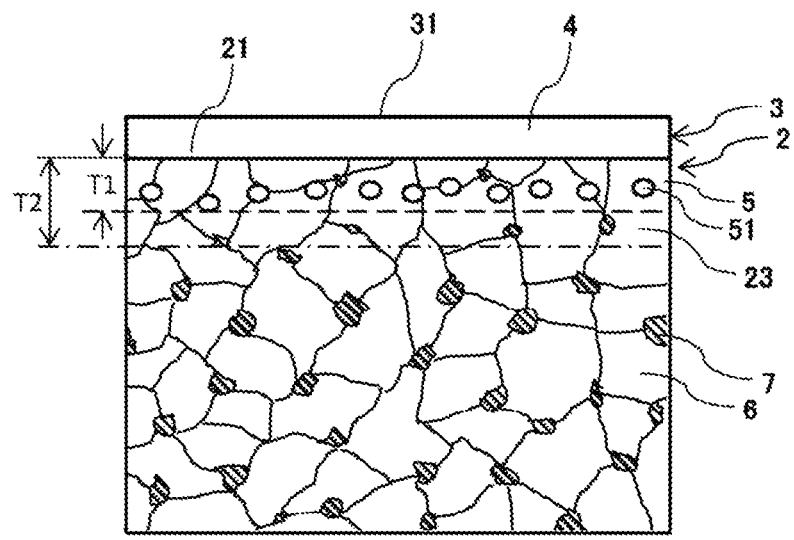
FIG. 5 is a schematic diagram of a cross-sectional structure in the vicinity of a pore existing region of a back-metal layer of another example of the sliding member according to the present invention

FIG. 5 is a cross-sectional schematic diagram of another embodiment of the sliding member according to the present invention. This embodiment differs from the embodiment shown in FIG. 2 in that a structure in the pore existing region 5 of the back-metal layer 2 includes a lower ratio of pearlite 7. Other configurations in FIG. 5 are same as those of the embodiment in FIG. 2, and is thus not described.

FIG. 5 is an enlarged view showing a structure of the pore existing region 5 in the vicinity of the bonding surface 21 of the back-metal layer 2. In FIG. 5, the ferrite phase 6 and the pearlite 7 in the structure are exaggerated for easier understanding. A structure of a center portion in the thickness direction of the back-metal layer 2 (hereinafter simply referred to as "center portion of the back-metal layer 2") is the same as the structure shown in FIG. 2A.

A volume ratio of the pearlite 7 in the structure of the pore existing region 5 is lower by not less than 50% than a volume ratio of the pearlite 7 in the structure of the center portion of the back-metal layer 2. That is, a volume ratio Pc of the pearlite in the structure of the center portion of the back-metal layer 2 and a volume ratio Ps of the pearlite in the pore existing region 5 satisfy Ps/Pc≤0.5.

An area ratio of the pearlite 7 in the structure is obtained in the following manner. First, a cross-sectional structure at a plurality of portions (e.g., 5 portions) cut in a direction parallel to a thickness direction of the sliding member 1 (i.e., a direction perpendicular to the sliding surface 31) is prepared. Next, electronic images of each of the center portion of the back-metal layer 2 and the pore existing region 5 of the back-metal layer 2 of the cross-sectional structure are taken at a magnification of 500 times with use of an electron microscope. Then, the area ratio of the pearlite 7 in the structure is measured in the images with use of a general image analysis method (analysis software: Image-Pro Plus (Version 4.5) manufactured by Planetron, Inc.). Thus, it can be confirmed that the area ratio of the pearlite 7 in the structure in the pore existing region 5 (except for the closed pores 51) is lower by not less than 50% than the area ratio of the pearlite 7 in the structure of the center portion of the back-metal layer 2.

The center portion of the back-metal layer 2 may not necessarily be a strictly at a center position in the thickness direction of the back-metal layer 2. This is because a structure between the back surface 22 and a portion in the vicinity of the pore existing region 5 of the back-metal layer 2 is substantially the same structure (the area ratio of ferrite phase 6/pearlite 7 is approximately the same). Thus, the "center portion of the back-metal layer 2" herein includes the portion located at the center position in the thickness direction of the back-metal layer 2 as well as a portion in the vicinity of the center position. In the above observation, the volume ratio of the pearlite 7 in the structure is measured as the area ratio in cross-sectional view, and the value of the area ratio corresponds to a volume ratio of the pearlite 7 in the structure.

The back-metal layer 2 has a portion (low-pearlite region) 23 in which the volume ratio of the pearlite 7 in the structure is lower by not less than 50% than the volume ratio of the pearlite 7 in the structure of the center portion of the back-metal layer 2. The low-pearlite region 23 extends from the bonding surface 21 and crosses the pore existing region 5, and is located also on an inner side in the thickness direction of the back-metal layer (see FIG. 5).

A thickness T2 (thickness from the bonding surface 21) of the low-pearlite region 23 is preferably 1.1 to 1.5 times the thickness T1 of the pore existing region 5 (T2/T1=1.1 to 1.5) in cross-sectional view perpendicular to the sliding surface 31.

The back-metal layer 2 includes a hypoeutectoid steel including 0.07 to 0.35 mass % of carbon. The hypoeutectoid steel has a structure including the ferrite phase 6 and the pearlite 7. A ratio of the pearlite 7 in the hypoeutectoid steel is determined according to the amount of carbon included in the steel, and is typically not more than 30 volume %. The center portion of the back-metal layer 2 has such a typical structure of a hypoeutectoid steel.

However, the volume ratio of the pearlite 7 in the structure of the pore existing region 5 on the bonding surface 21 of the back-metal layer 2 serving as the interface with the sliding layer 3 is lower by not less than 50% than the volume ratio of the pearlite 7 in the structure of the center portion of the back-metal layer 2. A difference in elastic deformation between the ferrite phase 6 and the copper alloy is smaller than a difference in elastic deformation between the pearlite 7 and the copper alloy. Accordingly, when an external force is applied to the sliding member, a difference in elastic deformation is small at an interface between the copper alloy 4 of the sliding layer 3 and the pore existing region 5 of the back-metal layer 2, and thus shear failure is less likely to occur at the interface, leading to stronger bonding between the copper alloy 4 of the sliding layer 3 and the back-metal layer 2.

On the other hand, the back-metal layer 2, except for the low-pearlite region 23, has a structure of a hypoeutectoid steel including a typical amount of pearlite, and thus has high strength required for the back-metal layer 2. Therefore, the sliding member 1 is less likely to be plastically deformed by circumferential stress applied when the sliding member is mounted to the bearing housing or circumferential force applied to the sliding member during operation of the bearing device.

A method of producing a sliding member according to the present embodiment is described below.

First, a copper alloy powder having the composition described above for a sliding layer is prepared. When producing a sliding layer including the hard particles and/or the solid lubricant, a mixed powder of the copper alloy powder and the hard particles and/or the solid lubricant particles is prepared.

The prepared copper alloy powder or mixed powder is scattered on a steel (hypoeutectoid steel) plate having the composition described above, and then subjected to first sintering in a reducing atmosphere at a temperature of 800 to 950° C. in a sintering furnace without applying pressure to the scattered powder to form a porous copper alloy layer on the steel plate, followed by cooling to a room temperature.

Next, first rolling is performed to make the porous copper alloy layer dense and activate a portion in the vicinity of a surface of the steel plate in contact with the porous copper alloy layer. In conventional production of a sliding member, first rolling has been performed for the purpose of reducing pores of a porous copper alloy layer to make the porous copper alloy layer dense, and a steel plate has hardly been rolled. However, in the production of a sliding member according to the present invention, a rolling ratio in the first rolling is higher than in the conventional production, and the rolling is continued even after the porous copper alloy layer is densified. Before the first rolling, the porous copper alloy layer has lower hardness than the steel plate. However, until pores of the porous copper alloy layer are reduced to make the porous copper alloy layer dense by the first rolling, only the porous copper alloy layer is plastically deformed and thus sufficiently work hardened. Furthermore, when the densified and work hardened porous copper alloy layer is further rolled, the hardness relationship is reversed and the porous copper alloy layer has higher hardness than the steel plate (e.g., a surface of the densified copper alloy layer of the rolled member after the first rolling has Vickers hardness higher by approximately 15 Hv than Vickers hardness of a back surface of the steel plate), and the steel plate starts to be rolled. Thus, by the first rolling, the portion in the vicinity of the surface of the steel plate in contact with the copper alloy layer having increased hardness is activated due to a larger amount of crystal distortion introduced to the portion in the vicinity of the surface of the steel plate than to an inner portion of the steel plate.

Next, the rolled member is subjected to a recovery treatment at a temperature of not lower than 650° C. but lower than a recrystallization temperature of the steel back-metal (e.g., less than 700° C.) for a holding time of 2 to 10 minutes in a reducing atmosphere in a sintering furnace. Then, the rolled member is subjected to second sintering in a reducing atmosphere of 800 to 950° C. to sinter the copper alloy layer, and cooled to a room temperature. At this time, a pore existing region is formed on a surface of a back-metal layer serving as an interface with the copper alloy layer.

A mechanism of forming the pore existing region is presumed as follows.

In the above recovery treatment, a recovery phenomenon occurs in the steel plate. The recovery phenomenon is such a phenomenon that when a steel plate is heated to a temperature of lower than a recrystallization temperature of the steel plate, a part of crystal distortion (atomic vacancy) introduced to an Fe atomic arrangement by the first rolling (cold working) moves (diffuses) to a surface (bonding surface) of the steel plate and is eliminated.

The part of the crystal distortion (atomic vacancy) introduced to the portion in the vicinity of the surface of the steel plate in contact with the copper alloy layer densified by the first rolling is moved by the recovery process toward the surface side of the steel plate in contact with the copper alloy layer. During the recovery process, simultaneously, Ni and P included in the copper alloy diffuse in the vicinity of the bonding surface of the steel plate to be replaced with the atomic vacancy. Diffused Ni and P serve as resistance to diffusion (movement) so that the crystal distortion (atomic vacancy) which exist at a portion inner side of the steel plate than the region where Ni and P diffused is prevented to move toward the bonding surface. Thus, presumably, most of the crystal distortion (atomic vacancy) in the portion at the inner side of the steel plate than the region where Ni and P diffuse is partially aggregated to form closed pores in the vicinity of a boundary between the region where Ni and P diffuse and the region where Ni and P do not diffuse.

However, when the copper alloy includes less than 0.06 mass % of P, Ni in the copper alloy is less likely to diffuse in the vicinity of the surface of the steel plate, and thus a pore existing region is less likely to be formed. Although the details are unclear, presumably, when the copper alloy includes a large amount of P (not less than 0.06 mass %), a large amount of Cu—P-based liquid phase is generated in the copper alloy in the recovery process, thereby prompting diffusion of Ni and P in the vicinity of the surface of the steel plate.

In the first rolling, when the surface of the densified copper alloy layer of the rolled member has Vickers hardness higher by not less than approximately 20 Hv than the Vickers hardness of the back surface of the steel plate, the low-pearlite region 23 is formed on the surface of the back-metal layer serving as the interface with the copper alloy layer.

A mechanism of forming the low-pearlite region 23 is presumed as follows.

Before a temperature reaches an A1 transformation point (727° C.) during the temperature rise in the second sintering process, recrystallization phenomenon occurs, in the back-metal layer (steel plate) of the rolled member, earlier in the vicinity of the bonding surface serving as the interface with the copper alloy layer which is activated as compared with the inner portion. Thus, immediately before the temperature reaches the A1 transformation point, a ratio between the ferrite phase and the pearlite are the same in the structure in the vicinity of the bonding surface of the back-metal layer and in the structure of the inner portion of the back-metal layer, but the ferrite phase has larger grains in the vicinity of the surface than in the inner portion.

When the temperature reaches the A1 transformation point, the pearlite of the back-metal layer is transformed to an austenitic phase, and the back-metal layer becomes a structure composed of the ferrite phase and the austenitic phase. (Immediately after the temperature reaches the A1 transformation point, a ratio of the austenitic phase and a concentration of carbon solid-solved in the austenitic phase in the structure of the back-metal layer do not differ between the portion in the vicinity of the bonding surface and the inner portion of the back-metal layer.) After that, during the temperature rise until the temperature exceeds the A1 transformation point and reaches an A3 transformation point (a temperature at which the structure becomes a structure of the austenitic single phase), the ferrite phase in the structure is gradually transformed to the austenitic phase in the back-metal layer, leading to reduction in the ratio of the ferrite phase in the structure.

The ferrite phase in the structure in the vicinity of the bonding surface of the back-metal layer has a larger grain size and is more stable than the ferrite phase in the structure of the inner portion of the back-metal layer, and is thus less likely to be transformed to an austenitic phase. Throughout the temperature rise, a ratio of the austenitic phase in the structure in the vicinity of the surface of the back-metal layer is lower than a ratio of the austenitic phase in the structure of the inner portion of the back-metal layer.

Carbon atoms are hardly solid-solved (approximately 0.02 mass % at maximum) in the ferrite phase in the structure, and thus carbon atoms having included in the pearlite are solid-solved in the austenitic phase in the vicinity of the surface of the back-metal layer. However, the amount of carbon atoms solid-solved in the austenitic phase in the vicinity of the surface of the back-metal layer is smaller (in volume) than the amount of carbon atoms solid-solved in the austenitic phase in the inner portion of the back-metal layer. Thus, a concentration of carbon differs between the austenitic phase in the vicinity of the surface of the back-metal layer and the austenitic phase in the inner portion of the back-metal layer. In order to eliminate the difference in the concentration, the carbon atoms having included in the austenitic phase in the vicinity of the surface diffuse in the austenitic phase in the inner portion, and thus the amount of carbon included in the structure in the vicinity of the surface becomes smaller than the amount of carbon included in the structure of the inner portion.

In the subsequent cooling process, when the temperature reaches the A1 transformation point, the back-metal layer becomes a structure composed of the ferrite phase and the pearlite. However, after the cooling, the volume ratio of the pearlite in the structure in the vicinity of the surface presumably becomes lower than the volume ratio of the pearlite in the structure of the inner portion during the temperature rise described above for the following reasons:

(i) The amount of carbon included in the structure in the vicinity of the bonding surface serving as the interface with the copper alloy layer is smaller than the amount of carbon included in the structure of the inner portion; and (ii) The volume ratio of the ferrite phase remaining in the structure differs between the structure in the vicinity of the surface and the structure of the inner portion during the temperature rise.

In the conventional production of a sliding member, first rolling is performed only such an extent that a porous copper alloy layer is densified, and thus a back-metal layer is not rolled. This rolling does not activate a portion in the vicinity of an interface between the back-metal layer (steel plate) and the densified copper alloy layer to introduce a larger amount of crystal distortion in the vicinity of the interface than in an inner portion of the back-metal layer. Therefore, even when a recovery process is performed in the same conditions described above, no pore existing region is formed in the structure of the back-metal layer after the subsequent second sintering process, and the volume ratio of pearlite does not differ between the structure in the vicinity of the surface and the structure of the inner portion.

Even when a member including a copper alloy layer and a back-metal layer subjected to rolling for densification and then second sintering (as in JP 2006-22896A) is further subjected to second rolling to roll both the copper alloy layer and the back-metal layer, since the copper alloy already has lower hardness than the back-metal layer by heat treatment during the second sintering and the copper alloy layer is already densified, the second rolling does not cause only the copper alloy layer to be plastically deformed (work hardened). Thus, the second rolling does not cause the copper alloy layer to be more work hardened to have sufficient hardness than the back metal, thereby preventing activation of only a portion in the vicinity of an interface with the copper alloy layer to introduce a larger amount of crystal distortion to the portion in the vicinity of the interface than to the inner portion of the back-metal layer. Therefore, even when the rolled member is subjected to a recovery process in the same conditions as described above and third sintering in the same conditions as the sintering conditions of the second sintering, no pore existing region is formed, and the ratio of pearlite does not differ between the structure in the vicinity of the surface and the inner portion of the back-metal layer.

The sliding member of the present invention is not limited to application to a bearing used in an internal combustion engine or an automatic transmission, and can be applicable to a bearing used in various machines. Furthermore, the shape of the bearing is not limited to a cylindrical shape or a semi-cylindrical shape. The sliding member of the present invention is applicable, for example, to an annular or semi-annular thrust bearing that bears an axial load of a shaft member, an annular end plate having a substantially U-shaped cross section used in a clutch (one-way clutch) of an automatic transmission, and the like.

The invention claimed is:

1. A sliding member comprising:
 a back-metal layer having a back surface and a bonding surface; and
 a sliding layer on the bonding surface of the back-metal layer, the sliding layer being made of a copper alloy and having a sliding surface, the copper alloy comprising 0.5 to 12 mass % of Sn, 0.5 to 15 mass % of Ni, 0.06 to 0.2 mass % of P, and the balance of Cu and inevitable impurities,
 wherein the back-metal layer is made of a hypoeutectoid steel comprising 0.07 to 0.35 mass % of carbon, and has a structure comprising a ferrite phase and pearlite,
 wherein the back-metal layer includes a pore existing region, the pore existing region including a plurality of closed pores that are not open to the bonding surface when viewing a cross-section perpendicular to the sliding surface, the closed pores having an average size of 5 to 15 µm, the pore existing region extending from the bonding surface toward an inner portion of the back-metal layer and having a thickness of 10 to 60 µm, and
 wherein a ratio V2/V1 of a total volume V2 of the closed pores to a volume V1 of the pore existing region is 0.05 to 0.1.

2. The sliding member according to claim 1, wherein an average distance between the closed pores and the bonding surface is 5 to 15 µm in the cross-sectional view perpendicular to the sliding surface.

3. The sliding member according to claim 1, wherein an average distance between adjacent ones of the closed pores in a direction parallel to the bonding surface is 5 to 15 µm in the cross-sectional view perpendicular to the sliding surface.

4. The sliding member according to claim 1, wherein an average aspect ratio of the closed pores is not more than 2.5 in the cross-sectional view perpendicular to the sliding surface.

5. The sliding member according to claim 1, wherein a volume ratio Pc of pearlite in a structure of a center portion in a thickness direction of the back-metal layer and a volume ratio Ps of pearlite in the pore existing region satisfy the following relation:

$$Ps/Pc \leq 0.5.$$

6. The sliding member according to claim 1, wherein a region of the back-metal layer excluding the pore existing region has a composition including 0.07 to 0.35 mass % of C, not more than 0.4 mass % of Si, not more than 1 mass % of Mn, not more than 0.04 mass % of P, not more than 0.05 mass % of S, and the balance of Fe and inevitable impurities.

7. The sliding member according to claim 1, wherein the copper alloy further includes one or more selected from 0.01 to 10 mass % of Fe, 0.01 to 5 mass % of Al, 0.01 to 5 mass % of Si, 0.1 to 5 mass % of Mn, 0.1 to 30 mass % of Zn, 0.1 to 5 mass % of Sb, 0.1 to 5 mass % of In, 0.1 to 5 mass % of Ag, 0.5 to 25 mass % of Pb, and 0.5 to 20 mass % of Bi.

* * * * *